Aug. 10, 1943.  F. N. MOERK ET AL  2,326,303
SEWAGE TREATMENT
Filed July 8, 1939
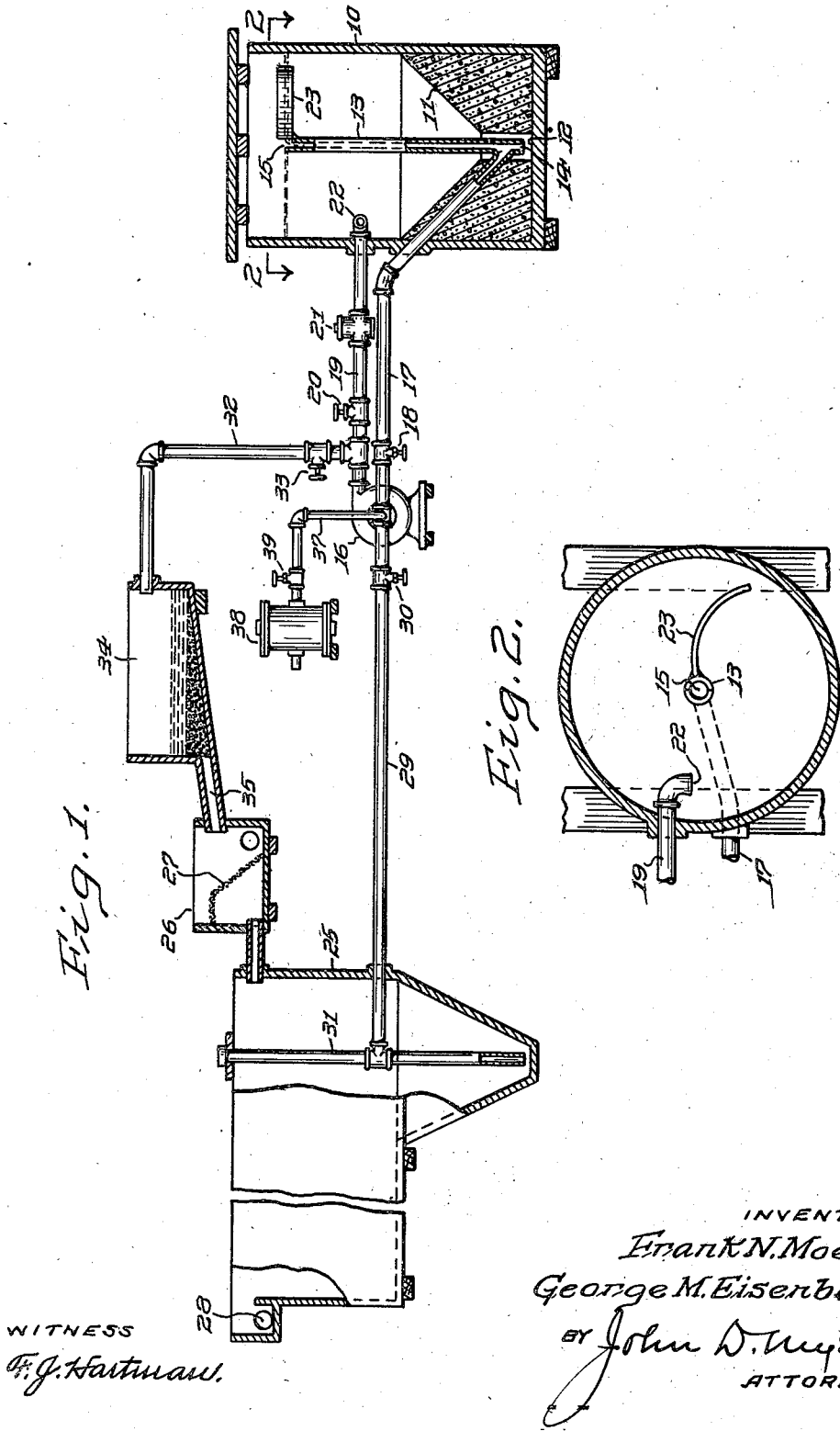
INVENTORS
Frank N. Moerk,
George M. Eisenberg.
BY John D. Myers
ATTORNEY
WITNESS
F. J. Hartman.

Patented Aug. 10, 1943

2,326,303

UNITED STATES PATENT OFFICE 2,326,303

SEWAGE TREATMENT

Frank N. Moerk and George M. Eisenberg, Philadelphia, Pa., assignors of one-fourth to Edward P. Hyland and one-fourth to A. M. Stackhouse, both of Moorestown, N. J.

Application July 8, 1939, Serial No. 283,440

10 Claims. (Cl. 210—2)

The invention relates to sewage treatment, and involves an improvement in method and apparatus for digesting the solid matter or sludge obtained by sedimenting raw sewage or the like.

Domestic or sanitary sewage ordinarily contains from 80 to 300 parts of suspended solids in 1,000,000 parts of the raw sewage, the concentration thus amounting to approximately .008 to .03 per cent. The sludge obtained from such sewage by natural sedimentation contains from 5000 to 60,000 parts of suspended matter in 1,000,000 parts of the sedimented sludge, this concentration thus amounting to .5 to 6 per cent. Thus the concentration of suspended solids in such sludge is from 62.5 to 200 times the concentration of the suspended solids in the raw sewage before it is treated. Computed in a dry state, these solids contain from 75 to 85 per cent. of organic matter which is very unstable and putrefactive. Consequently these solids represent a considerable nuisance in the disposition of sewage, and their treatment involves one of the major problems in the design and operation of sewage treatment works.

It has been found from experience that the benefits to be derived from sewage treatment can be obtained more readily if the solid constituents of the sewage are removed from the liquid portion so that the solids and liquids may be treated separately. This has led to the adoption of sedimentation as a preliminary step in the purification and treatment of raw sewage. Plain sedimentation wherein the action of gravity is utilized for depositing the solid matter from the liquid will normally remove from 60 to 70 per cent. of the suspended solids from ordinary sewage flowing through a settling tank with a retention period of one and one-half to two hours. The rate of sedimentation and the extent to which the solids may be removed from the liquid can be increased considerably by flocculating or coagulating the suspended solids, and in practice this is accomplished either by the addition of chemicals to the raw sewage, as in chemical precipitation, or by the action of biological media, as in the activated sludge process.

Our improvement relates to the digestion of the sludge, irrespective of the particular process which is employed for precipitating it or separating it from the liquid. As ordinarily understood, sludge digestion may be considered as a biochemical process by means of which the unstable organic matter is liquified, gasified, mineralized, or converted to more stable organic compounds. It is accepted practice at the present time to subject sewage sludge to anerobic biological decomposition in closed tanks. The anerobic process is dependent upon the action of anerobic bacteria and the maintenance of environmental conditions conducive to their growth, and requires from six weeks to six months to effect a reduction of 50 per cent. in the organic constituents of the sludge, and the process is attended by the liberation of offensive odors and combustible gases. While a 50 per cent. reduction in the organic content of the sludge during the time interval mentioned is recognized as the practical limit of digestion, recent studies indicate that it is possible to reduce the time required for the process to 30 to 50 days if optimum conditions are maintained. In practice, the digested sludge is removed periodically from the anerobic digestion tanks and discharged to drying beds which permit the liquid to drain from the sludge and provide atmospheric drying of the remaining solid matter prior to its ultimate disposition.

The process which we have devised is of biological character. It depends upon the enzymatic activity of a microflora in which aerobic bacteria, fungi, and Protozoa predominate, and also upon the maintenance of conditions which are conducive to the development and maintenance of this flora. A culture of this character effects a rapid decomposition of cellulose and of animal and vegetable greases, and converts protein substances into simpler and more stable forms within a period of time which is relatively short in comparison with the time required for anerobic digestion. We have found that the conditions which are favorable for such a floral development are obtained when intimate contact between the flora and the solid matter to be digested is continuously maintained; when the media is continuously agitated in contact with the air so that it may contain a sufficient amount of dissolved oxygen at all times during the digesting process; when the gases generated during the digestion process are withdrawn or permitted to escape; when the solids are so maintained in suspension during the digesting process that there is no deposit on the bottom of the digesting tank; when the floating matter and scums tending to accumulate on the surface of the sludge under treatment are constantly removed so that the presence of a surface scum will not give rise to undesired anerobic decomposition of the solids; and when the sludge is protected from the strongly actinic rays of the sun.

One of the primary objects of our invention is a reduction in the time heretofore required for the digestion of sludge and the like. It is a further object of our invention to digest the sludge without the production of offensive odors. A further object of our invention is the digestion of sludge without the production of combustible gases, which are recognized as constituting a fire and explosion hazard. It is also an object of our invention to so digest sludge and the like as to produce an inoffensive and inert residue which may be readily disposed of upon its removal from the drying beds. It is a still further object of our invention to effect economies in the digestion process, both by reducing the size of the digestion tank and the area of the drying beds.

A form and arrangement of apparatus which we have devised for carrying out our improved method is illustrated somewhat diagrammatically in the accompanying drawings wherein:

Fig. 1 is a side elevational view, partly in section, showing our improved digesting apparatus and the manner in which it may be employed in sewage treatment works in which plain sedimentation is utilized in separating the solid matter from the raw sewage; and Fig. 2 is a horizontal section view of the digestion tank slightly enlarged, taken on the line 2—2 of Fig. 1.

The digestion apparatus comprises a tank 10 which is preferably provided with sloping bottom walls 11 for directing the contents of the tank to a sump 12. An open-ended skimming pipe 13 is supported vertically in the tank 10 with its lower end 14 projecting into the sump 12 and its upper end 15 terminating at the desired level of the upper surface of the sludge under treatment. A sludge pump 16 is positioned outside the tank 10 with its inlet connected through a pipe 17, having a valve 18 therein, to the skimming pipe 13 near the lower end of the latter, such as the portion thereof projecting into the sump. The outlet from the pump 16 is provided with a return connection to the tank 10 through a pipe 19 having a valve 20 and preferably a flow meter 21 therein. The pipe 19 discharges tangentially into the tank 10 as indicated at 22, at a point below the level of the upper end 15 of the pipe 13.

The function of the pump 16 and the connections just described is to circulate the sludge under treatment in the digestion tank from the bottom of the tank through the open end 14 of pipe 13, and discharge it from the tangentially directed outlet 22, preferably beneath the upper surface of the contents of the tank. This circulation is at a rate such as to continuously rotate the contents of the tank so as to maintain the solid matter in suspension, to provide surface movement to thereby aid absorption of atmospheric oxygen, and to provide intimate contact between the microflora and the solid matter. The suction of the pump 16 also acts to draw into the open end 15 of pipe 13 any floatage, such as scum, grease and solid matter, from the surface of the sludge under treatment, and mix them thoroughly with the sludge withdrawn from the bottom of the digestion tank, the mixture being discharged from the tangential outlet 22. Although it is not essential except when low circulating velocities are used, a skimming blade 23 may be secured to the upper end of the vertical pipe 13 so as to extend outwardly therefrom substantially in a radial direction. This skimming blade may be slightly curved from end to end as shown in Fig. 2, so as to direct the moving floatage inwardly toward the open upper end of the pipe 13.

Our improved digestion apparatus may be incorporated in sewage treatment works having a sedimentation tank 25 into which raw sewage enters through an inlet 26 provided with a coarse screen 27, the effluent flowing out of the settling tank 25 through the outlet 28 whence it is chlorinated or otherwise treated, or discharged to the river as may be desired. The inlet to the sludge pump 16 is provided with a pipe connection 29 controlled by a valve 30 and leading to a vertically arranged pipe 31 in the settling tank 25. The lower end of pipe 31 is open to admit fresh sludge under the action of pump 16 for replacing digested sludge with fresh sludge in digestion tank 10. The outlet from the pump 16 is also provided with a pipe connection 32 having a control valve 33 therein and leading to drying beds 34 where the solids are de-watered and dried.

The drainings from the drying beds 34 may be returned to the inlet 26 through a suitable drain pipe 35. Preferably the drying beds 34 are divided into sections in order to provide adequate drying time for the treated sludge discharged to the beds from the digestion apparatus. A suitable arrangement of the drying beds 34 is one in which a separate section is provided for each day of the week, the sections being used in rotation when the works is in operation.

Means is provided for admitting air to the inlet side of the sludge pump 16 in order to insure that a proper amount of oxygen may be admixed with the circulated sludge. This air admitting means comprises a pipe 37 connected to the inlet of the pump and having an air meter 38 and a control valve 39 therein. While an air meter is not essential, a controlled air inlet of this character facilitates the admission of the proper amount of air to the sludge under treatment in the digestion tank 10 to insure complete aerobic digestion of the solids.

In placing the system in operation, sewage is admitted to the settling tank 25 through the inlet 26 until the contents of the settling tank reaches the level of the effluent outlet 28. As the sludge settles to the bottom of tank 25, when the pump 16 is placed in operation sludge is thereby drawn from the bottom of the settling tank through the pipe 31 and the connecting pipe 29 leading to the pump inlet, and is discharged into the digestion tank from the tangential outlet 22. During the process of pumping sludge from the settling tank to the digestion tank, the valves 18 and 33 are closed, and the valves 30 and 20 are open. The digestion tank is filled until the upper surface of its contents is at the level of the upper end of pipe 13. The microflora present in the sludge develop and propagate under the controlled conditions which are maintained in the digestion tank, and the fresh sludge furnishes nutrient thereto and is thereby digested.

When the digestion tank has thus been filled, the valve 30 is closed and the valve 18 opened, whereupon the sludge in the digestion tank will be circulated by the pump from the bottom of the digestion tank to the upper part thereof, and the contents of the tank will be set in rotation by reason of the tangential discharge from the outlet 22 into the upper portion of the tank. Simultaneously with the transfer of sludge from the sump 12 at the bottom of the digestion tank, the pump draws the floatage from the upper surface of the sludge under treatment in the digestion tank, the skimming blade 23 assisting in directing it to the upper end 15 of the skimming pipe 13 if this blade is used. The skimming blade or other directing means may be dispensed with where the circulation is violent enough to produce sufficient inclination of the surface of the contents of the tank 10 from the side wall to the inlet of the skimming pipe 13. The entire contents of the digestion tank are thereby circulated, agitated and thoroughly mixed to thus maintain intimate contact between the microflora and the solids present in the sludge.

In normal operation an insufficient amount of oxygen may be absorbed at the surface of the sludge in the digestion tank to effect proper aerobic digestion of the solids. The air supply connected to the inlet of the pump may therefore be utilized to insure the admixture of sufficient air with the sludge to effect complete digestion. By utilizing the air meter 38, the desired amount of air may be added to the circulating sludge by regulating the control valve 39 in the air inlet pipe.

When our system is in operation, the circulation of sludge from the bottom of the digestion tank 10 to the tangential outlet 22 is maintained for a period of approximately 24 hours. At the end of each 24-hour period the valve 33 is opened, the valve 20 is closed, and a portion of the contents of the digestion tank is discharged to the drying beds 34. The valve 33 is then closed, valve 20 is opened, valve 18 closed and valve 30 opened, whereupon the pump will draw the solids which have accumulated in the bottom of the settling tank 25 during the previous 24-hour period and discharge them into the digestion tank at the discharge outlet 22. In order to maintain the proper level in the digestion tank, the quantity of solid matter thus transferred from the settling tank to the digestion tank will be only sufficient to replace the quantity of sludge withdrawn from the digestion tank and discharged to the drying beds.

The cycle is repeated during successive 24-hour periods and circulating levels are maintained. The digestion of the sludge proceeds as the flora develop in the digestion tank until the digester arrives at equilibrium with respect to sludge concentration. When this point is reached, digestion of the sludge is completed within the 24-hour period, and the process will take care of the sludge which accumulates daily in the settling tank. Under favorable conditions the aerobic flora become well established and good digestion of the solids is evident within 10 days after the system is placed in operation. We have found that the activity of this flora is such that a given volume of the sludge in the digestion tank will digest approximately up to one-fourth that volume of fresh sludge daily without producing offensive or combustible gases.

While our process is described above as being carried out in intermittent operations, it is desired to point out that the operation may be continuous. When practiced as a continuous process, treated sludge is continuously pumped from the bottom of the digestion tank and discharged into the drying beds, while fresh sludge is pumped continuously from the bottom of the settling tank and discharged into the upper part of the digestion tank at a rate equal to that at which the treated sludge is discharged to the beds. In such a continuous operation it is desirable to provide a digester capacity somewhat greater than that required for intermittent operation in order that the retention period in the digester may be sufficient to prevent an appreciable amount of partially digested solids from being discharged to the drying beds.

From the results obtained from the use of our process of aerobic digestion, we have found that the required capacity of the digester is approximately .08 to .16 cubic feet per capita, and that the required area of the drying beds ranges from .06 square feet per capita for covered beds to .12 square feet per capita for open beds. The figures as to the size of the drying beds are based upon beds which provide a separate section for each day of the week, thus making seven sections in all, each of which has an area sufficient for the daily sludge discharge. We have found, however, that four days are ample for the de-watering and drying operation when the beds are open and the weather is clear. Consequently the figures given for the area of the drying beds are much larger than necessary under the most satisfactory drying conditions.

In anerobic digestion of sludge the capacity of the digester must be approximately 1.5 cubic feet per capita, and the required drying bed area ranges from .5 square foot per capita where glass covered beds are used to 1 square foot per capita where exposed beds are used. A comparison of the digester capacity required when our aerobic method is used, with the digester capacity required with the anerobic method, therefore shows that the capacity of the digester required with our method is approximately 5.3 to 10.6 per cent. of the capacity of the digester required with accepted anerobic methods. It will also be apparent from a comparison of the area of the drying beds required with our method of sludge treatment with the area of the drying beds utilized with accepted anerobic methods of digestion, that the beds required with our aerobic method are approximately 12 per cent. of the area of the beds required with accepted anerobic methods.

These comparisons amply illustrate the economic advantages inherent in our improvement. In addition, our improved method has the further advantage in time economy in that the actual time required both for complete digestion of the sludge and for complete treatment of the raw sewage is much less than that which has heretofore been required with other methods. Furthermore, there is no accumulation of combustible gases during the digestion process and the explosion hazard which is inherent in many processes now in use is eliminated. Our improved method is also advantageous in that no offensive odors are produced by this method of digestion, and the digested sludge is inert, inoffensive, and may be readily de-watered.

What we desire to claim as our invention is:

1. The process of treating sewage which comprises sedimenting the putrefiable sludge from the liquid, subjecting the putrefiable sludge, while confined in a container open to the air and protected from the actinic rays of the sun, to the digestive action of a microflora in which aerobic bacteria, fungi and Protozoa predominate, continuously pumping the sludge from the bottom of the container and discharging it at the upper surface of the sludge tangentially to the side of the container at a rate sufficient to rotate the sludge in the container and maintain all of the solids in suspension, maintaining the surface of the sludge free from scums and solids during the pumping operation, and discharging a portion of the sludge so treated to drying beds at approximately 24-hour intervals and thereupon adding to the sludge under treatment a quantity of fresh sludge equal in volume to the discharge portion.

2. The process of treating putrefiable sludge, which comprises placing the sludge in a tank open to the air and protecting it from the actinic rays of the sun, subjecting the sludge to the digestive action of a microflora in which aerobic bacteria, fungi and Protozoa predominate, pumping the sludge from the bottom of the tank and the scums and solids from the surface of the sludge and discharging the mixture into the tank beneath the upper surface of the sludge and tangentially to the side of the tank so as to rotate the contents of said tank, discharging a portion of the treated sludge to drying beds at intervals of approximately 24 hours and thereupon adding to the tank a quantity of fresh sludge approximating in volume the treated sludge so discharged.

3. The process of treating putrefiable sludge, which comprises placing the sludge in a tank open to the air and protecting it from the actinic rays of the sun, subjecting the putrefiable sludge to the digestive action of a microflora in which aerobic bacteria, fungi and Protozoa predominate, continuously pumping the sludge from the bottom of the tank and discharging it, with air incorporated therein, into the tank beneath the upper surface of the sludge so as to agitate the contents of the tank, maintain the solids in suspension and produce intimate contact between the microflora and the solids, and discharging a portion of the treated sludge to drying beds at intervals of approximately 24 hours and thereupon adding to the tank a quantity of fresh sludge approximating in volume the treated sludge so discharged.

4. Apparatus for treating sludge, comprising an open tank, a pump for circulating the sludge and having its inlet connected to the bottom of said tank and its outlet connected to the upper portion of said tank and directed so that the discharge therefrom will rotate the contents of said tank, and a skimming pipe connected to said inlet and having its inlet end terminating centrally in said tank slightly above the level of the point of discharge from said pump into said tank.

5. Apparatus for treating sludge, comprising an open tank, a pump for circulating the sludge and having its inlet connected to the bottom of said tank and its outlet connected to the upper portion of said tank and directed so that the discharge therefrom will rotate the contents of said tank, a skimming pipe connected to said inlet and having its inlet end terminating centrally in said tank slightly above the level of the point of discharge from said pump into said tank, and means for directing floatage on the upper surface of the contents of the tank to the inlet end of said skimming pipe.

6. Apparatus for treating sludge, comprising an open tank, a pump for circulating the sludge and having its inlet connected to the bottom of said tank and its outlet connected to the upper portion of said tank and directed so that the discharge therefrom will rotate the contents of said tank, a skimming pipe connected to said inlet and having its inlet end terminating centrally in said tank slightly above the level of the point of discharge from said pump into said tank, and a skimming blade positioned adjacent the inlet end of said skimming pipe to direct floatage on the upper surface of the contents of the tank to the inlet end of said skimming pipe.

7. Apparatus for treating sludge, comprising an open tank having a sump in the bottom thereof, a pump for circulating the sludge having its inlet connected with said sump and its outlet directed into the upper portion of said tank and tangentially to the side of the tank so as to rotate the contents thereof, a skimming pipe having its inlet positioned centrally in said tank at a level above the point of outlet from said pump into said tank and having its outlet connected to the inlet to said pump, adjustable means for admitting air to the inlet connection to said pump, and a skimming blade extending outwardly from said skimming pipe to direct floatage on the upper surface of the contents of said tank to the inlet of said skimming pipe.

8. Apparatus for treating sludge, comprising a settling tank for raw sewage, a sludge digesting tank, a drying bed, a pump having its inlet connected to the bottom of said settling tank and the bottom of said digesting tank and its outlet discharging into the upper portion of said digesting tank tangentially to the side of the tank and into said drying bed, a skimming pipe having its inlet positioned centrally in said digesting tank at a point above the level of the outlet from said pump into said digesting tank and having its outlet connected to the inlet to said pump in said digesting tank, means for directing floatage on the upper surface of the contents of said digesting tank to the inlet of said skimming pipe, and control means operable at will to connect the inlet of said pump with said settling tank or said digesting tank and to connect the outlet of said pump with said digesting tank or said drying bed.

9. The process of treating putrefiable sludge, which comprises placing the sludge in a tank open to the air and protecting it from the actinic rays of the sun, subjecting the sludge to the digestive action of a microflora in which aerobic bacteria, fungi and Protozoa predominate, pumping the sludge from the bottom of the tank and the scums and solids from the surface of the sludge, and discharging the mixture into the tank beneath the upper surface of the sludge and tangentially to the side of the tank so as to rotate the contents of said tank.

10. The process of treating a putrefiable sludge, which comprises placing the sludge in a tank open to the air and protecting it from the actinic rays of the sun, subjecting the putrefiable sludge to the digestive action of a microflora in which aerobic bacteria, fungi, and Protozoa predominate, continuously pumping the sludge from the bottom of the tank, and discharging it, with air incorporated therein, into the tank beneath the upper surface of the sludge so as to agitate the contents of the tank, maintain the solids in suspension, and produce intimate contact between the microflora and the solids.

FRANK N. MOERK.
GEORGE M. EISENBERG.